United States Patent [19]

Ishikawa

[11] Patent Number: 5,787,303

[45] Date of Patent: Jul. 28, 1998

[54] DIGITAL COMPUTER SYSTEM CAPABLE OF PROCESSING A PLURALITY OF INSTRUCTIONS IN PARALLEL BASED ON A VLIW ARCHITECTURE

[75] Inventor: Tadashi Ishikawa, Tokyo, Japan

[73] Assignee: Kabushiki Kaisha Toshiba, Kawasaki, Japan

[21] Appl. No.: 828,773

[22] Filed: Mar. 27, 1997

Related U.S. Application Data

[63] Continuation of Ser. No. 968,398, Oct. 29, 1992, abandoned.

[30] Foreign Application Priority Data

Oct. 31, 1991 [JP] Japan ................... 3-286100
Oct. 31, 1991 [JP] Japan ................... 3-286224

[51] Int. Cl.$^6$ ....................................... G06F 9/40
[52] U.S. Cl. ....................... 395/800.24; 395/800.23
[58] Field of Search ........................ 395/800.23, 800.24

[56] References Cited

U.S. PATENT DOCUMENTS

| | | | |
|---|---|---|---|
| 5,006,980 | 4/1991 | Sanders et al. | 395/395 |
| 5,051,940 | 9/1991 | Vassiliadis et al. | 364/736.04 |
| 5,121,488 | 6/1992 | Ngai | 395/570 |
| 5,214,763 | 5/1993 | Blauer et al. | 395/388 |
| 5,301,331 | 4/1994 | Ueno et al. | 395/733 |
| 5,307,506 | 4/1994 | Colwell et al. | 395/307 |
| 5,381,531 | 1/1995 | Hanawa et al. | 395/582 |
| 5,398,321 | 3/1995 | Jeremiah | 395/392 |

OTHER PUBLICATIONS

Joseph A. Fisher et al., "Instruction-Level Parallel Processing", Sep. 13, 1991, pp. 1233-1241.

Alexandra Nicolan et al., "Realistic Scheduling: Compaction for Piplined Architectures", 1990, pp. 69-79.

Alexandra Nicolau, "Run-Time Disambiguation: Coping with Statically Unpredictable Dependencies", 1989, pp. 663-678.

Katsuyaki Kaneko, "Microprocessors", 1989, pp. 78-79, 296.

Colwell et al., "AVLIW Architecture for a Trace Scheduling Compiler", IEEE Transactiions on Computers, Aug. 1988, vol. 37, No. 8, pp. 967-979.

Weiss, "Scalar Supercomputer Architecture," Proceedings of the IEEE, Dec. 1989, vol. 77, No. 12 pp. 1970-1989.

McCrackin, "Eliminating Interlocks in Deeply Pipelined Processors by Delay Enforced Multistreaming," IEEE Trans. on Comp., vol. 40, No. 10, Oct. 1991, pp. 1125-1132.

Iacobovici et al., "Balanced Microprocessor Design Keeps Performance Peaked," pp. 371-375.

Sohi, "Instruction Issue Logic for High-Performance, Interruptible, Multiple Functional Unit, Pipelined Computers," IEEE Trans. on Comp., vol. 39, No. 3, Mar. 1990, pp. 349-359.

Ellis, John R., "Bulldog: ACM Doctoral Dissertation Award 1985, Bulldog: A Compiler for VLIW Architectures," MIT Press 1986, pp. 1-50.

VLIW Architectures: Supercomputing Via Overlapped Execution, J.A. Fisher, Multiflow Computer, Inc., (1987).

*Primary Examiner*—Alyssa H. Bowler
*Assistant Examiner*—John Follansbee
*Attorney, Agent, or Firm*—Finnegan, Henderson, Farabow, Garret & Dunner, L.L.P.

[57] ABSTRACT

When a register whose content is not determined because a preceding arithmetic operation is still being executed is to be referred to by the following instruction word, or when the following instruction word uses an arithmetic operator unit which is still executing a preceding arithmetic operation, execution of the following instruction word is suspended until the preceding arithmetic operation is completed. Otherwise, even when the arithmetic operation of the preceding instruction word is being executed, control is made to execute the following instruction word without waiting for completion of the preceding arithmetic operation, thereby maximally utilizing parallel processing power.

27 Claims, 7 Drawing Sheets

DIGITAL COMPUTER SYSTEM CAPABLE OF PROCESSING A PLURALITY OF INSTRUCTIONS IN PARALLEL BASED ON A VLIW ARCHITECTURE

This application is a continuation of application Ser. No. 07/968,398 filed Oct. 29, 1992, now abandoned.

BACKGROUND OF THE INVENTION

1. Field of the Invention

The present invention relates to a VLIW (Very Long Instruction Word) arithmetic processing system in a stored-program type digital computer.

2. Description of the Related Art

The processing performance of a microprocessor is determined by three factors, i.e., its operation frequency, the number of cycles per instruction (CPI), and the number of instructions necessary for executing a program. More specifically, in order to improve the processing performance, it is required to increase the operation frequency, to decrease the CPI, and to decrease the number of program execution instructions.

Of the above-mentioned three factors, the operation frequency of a microprocessor is increasing year by year along with development of the semiconductor manufacturing techniques. However, the operation frequency of a chip available at each occasion has an upper limit. As the microprocessor, a CISC (Complexed Instruction Set Computer) microprocessor, an RISC (Reduced Instruction Set Computer) microprocessor, and a compromise type of these two types are available. The RISC chip can decrease the CPI as compared to the CISC chip. However, in this case, the CPI can only be decreased to unity. The number of program execution instructions depends upon capabilities of a programmer (or the performance of a compiler). However, a decrease in the number of program execution instructions is also limited.

Under such circumstances, a VLIW architecture and a Superscalar architecture are developed. In processors adopting these architectures, instructions, which can be parallel executed, are found from a program, and a plurality of processing operations are parallel executed. More specifically, a plurality of instructions are simultaneously decoded, and the decoded instructions are supplied to execution units, thereby executing processing operations at the same time. With this parallel processing, the CPI can be decreased below unity.

Each of the VLIW processor and the Superscalar processor incorporates a plurality of pipelines, and simultaneously executes a plurality of processing operations using these pipelines. However, these processors have the following differences.

(1) Difference in Instruction Stream Scheduling Method

In the Superscalar processor, its instruction decoder finds instructions that can be executed parallel, and dynamically performs scheduling upon instruction execution. For this reason, parallelism detection can only be performed using fetched instructions.

In contrast to this, in the VLIW processor, a program is scheduled upon compiling (or upon assembler coding). For this reason, although the load on a compiler (or a programmer) is increased as compared to the Superscalar processor, the VLIW processor can simplify its hardware arrangement (instruction decoder).

(2) Difference in Instruction Format

In general, the Superscalar processor has the same instruction format of a 32-bit length as that of a conventional RISC processor. The decoder of the Superscalar processor selects instructions that can be executed parallel from the fetched instructions, and supplies the selected instructions to the pipelines. In the Superscalar processor which supports the instruction format of the 32-bit length, the instruction format of the conventional 32-bit RISC processor can be utilized without modifications, and software compatibility with the existing RISC processors can be maintained on the object code level.

In contrast to this, the VLIW processor generally has an instruction format longer than 32 bits, and can designate a plurality of processing operations using one instruction. For this reason, although software compatibility with the existing RISC processors cannot be maintained, the VLIW processor can provide higher performance than the Superscalar processor.

In the case of a processor having a pipeline structure, one instruction is executed in units of a plurality of stages. Since one stage is executed by one clock in principle, all the instructions can be apparently executed by one clock as long as the pipelines operate smoothly. However, in practice, the pipelines are disturbed by various causes, and the actual processing speed of the processor is decreased. These causes are called "hazards". A mechanism for detecting these "hazards" in a hardware manner, and automatically delaying the pipelines is called "interlock".

The present invention relates to a parallel processing system based not on the Superscalar architecture but on the VLIW architecture. In particular, the present invention relates to a parallel processing system, which can improve the functions of the interlock, and minimizes a delay of the pipelines so as to attain high-speed processing.

A VLIW arithmetic processing system, which can simultaneously execute a plurality of arithmetic processing operations, executes an instruction word that can designate a plurality of arithmetic operations, and has a fixed length. In this case, it is required from the viewpoint of software that a plurality of arithmetic operations designated in one instruction word appear to be executed simultaneously.

On the other hand, the VLIW arithmetic processing system also supports a floating-point arithmetic operation to improve its processing performance. The floating-point arithmetic operation requires a plurality of cycles depending on the types of arithmetic operation, e.g., in division processing.

However, in the conventional VLIW arithmetic processing system, a plurality of arithmetic operations in one instruction word, which operations are designated to be simultaneously executed, must appear to be simultaneously executed with respect to software. For this reason, when the plurality of simultaneously designated arithmetic operations include an arithmetic operation requiring a long processing time, arithmetic operator units that have already completed their arithmetic operations are caused to wait in an idle state without executing the next instructions until the arithmetic operation requiring the long processing time is completed.

As described above, in the VLIW arithmetic processing system, since a plurality of arithmetic operations in one instruction word, which operations are designated to be simultaneously executed, must appear to be simultaneously executed from the viewpoint of software, execution of the next instruction word is not started until all the arithmetic processing operations included in the immediately preceding instruction word are completed. For this reason, when the plurality of simultaneously designated arithmetic operations include an arithmetic operation requiring a long processing time, arithmetic operator units that have already completed their arithmetic operations are caused to wait in an idle state without executing the next instructions until the arithmetic operation requiring the long processing time is completed. Thus, the parallel arithmetic processing time is prolonged, and the parallel arithmetic processing performance of the VLIW architecture cannot be sufficiently utilized.

SUMMARY OF THE INVENTION

The present invention has been made in consideration of the conventional problems, and has as its object to provide a VLIW arithmetic processing system, which can parallel execute the subsequent instruction word as much as possible while guaranteeing the execution order of arithmetic operations with respect to software even when a preceding arithmetic operation which requires a long processing time is being executed, so that the operating efficiency of arithmetic operator units for parallel processing is improved, and the processing performance of the arithmetic processing system can be improved as a whole.

A VLIW arithmetic processing system according to the present invention, which parallel processes a plurality of register-register arithmetic operations, comprises: detection means for detecting operands (register numbers) which are scheduled to store execution results of a currently executed instruction; identification means for, when an instruction is to be executed, comparing the operands detected by the detection means and operands (register numbers) designated by the instruction to be currently executed, and for, when a coinciding operand is found, identifying whether or not the content of the coinciding operand can be used; and means for, when the identification means identifies an unusable operand, causing execution of the instruction to be currently executed to wait with reference to the unusable operand, and for, when the identification means identifies a usable operand, performing parallel arithmetic processing using the usable operand. Even when an instruction, which requires a plurality of cycles in its processing, is being executed, subsequent instructions, which do not refer to the execution result of the currently executed instruction, are parallel executed.

In the VLIW arithmetic processing system of the present invention, when an instruction preceding to an instruction word to be currently executed is being executed, a register number, which is scheduled to store the execution result of the preceding instruction is compared with register numbers which are read out by the instruction word to be currently executed. When a coinciding register number is found, it is identified that the content of the register of the corresponding register number is still unusable. When this identification is made, execution of the instruction word to be currently executed is caused to wait. Otherwise, even when an instruction, which requires a plurality of cycles in its processing, is being executed, subsequent instructions, which do not refer to the execution result of the currently-executed instruction, are parallel executed, thus achieving high-speed processing of a plurality of instruction words.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
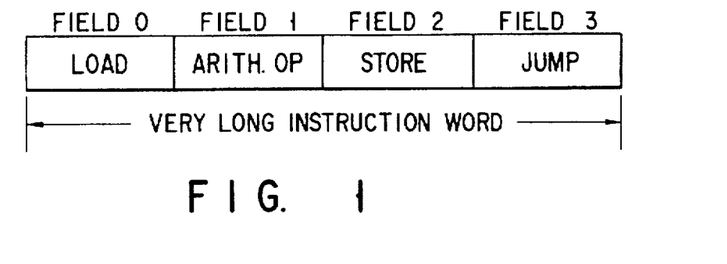
FIG. 1 shows an example of a VLIW.

FIG. 1 shows an example of a 128-bit VLIW in which four 32-bit length instruction words (e.g., Load, Arithmetic operation, Store, and Jump) are respectively assigned to fields 0 to 3. The instruction word "Arithmetic Operation" includes "Addition (ADD)", "Subtraction (SUB)", "Multiplication (MUL)", "Division (DIV)", "No OPeration (NOP)", and the like.

Figure 2:
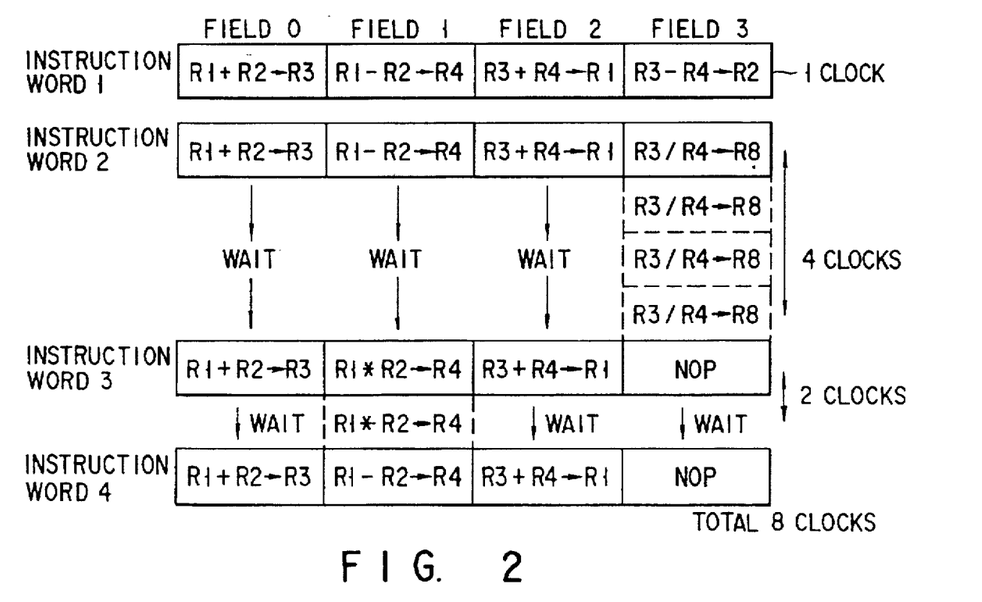
FIGS. 2 and 4 are views showing an example of VLIW parallel arithmetic processing when the present invention is not applied.

FIG. 2 shows an example of VLIW parallel arithmetic processing when the present invention is not applied. In this example, during execution of division (R3/R4) for four clocks in field 3, execution units in fields 0 to 2 stand idle for three clocks. During execution of multiplication (R1*R2) for two clocks in field 1, the execution units in fields 0, 2, and 3 stand idle for one clock. Due to these idle times, the arithmetic processing operations exemplified in FIG. 2 require a total of 8 clocks until they are completed.

Figure 3:
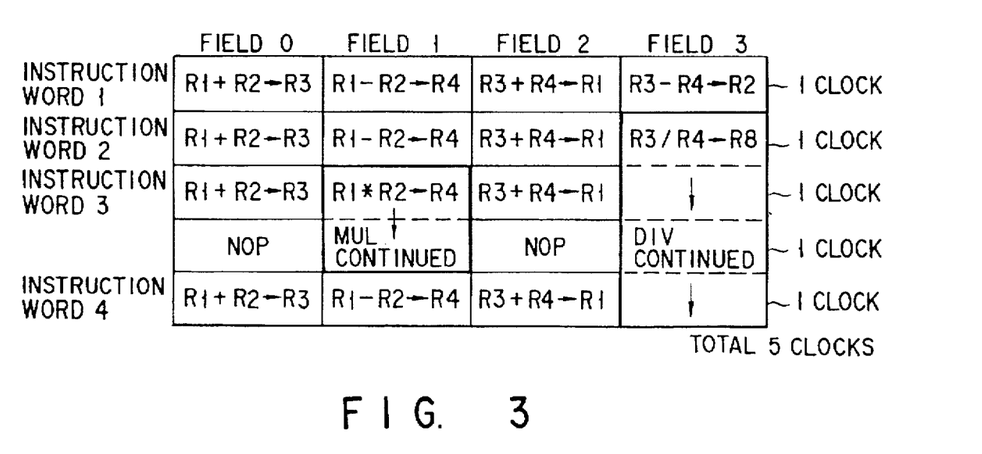
FIGS. 3 and 5 are views showing an example of VLIW parallel arithmetic processing when the present invention is applied.

FIG. 3 shows an example of VLIW parallel arithmetic processing when the present invention is applied. In this example, during execution of division (R3/R4) for four clocks in field 3, multiplication (R1*R2) for two clocks, and two subtractions (R1−R2) for one clock are executed in field 1, and two additions (R1+R2; R3+R4) for one clock, and one NOP for one clock for synchronizing timings are executed in fields 0 and 2. In the arithmetic processing exemplified in FIG. 3, since the idle time (execution of NOP) of the execution units in pipelines during processing of the division and multiplication is short, the arithmetic processing equivalent to that shown in FIG. 2 is completed in a total of 5 clocks.

Figure 6:
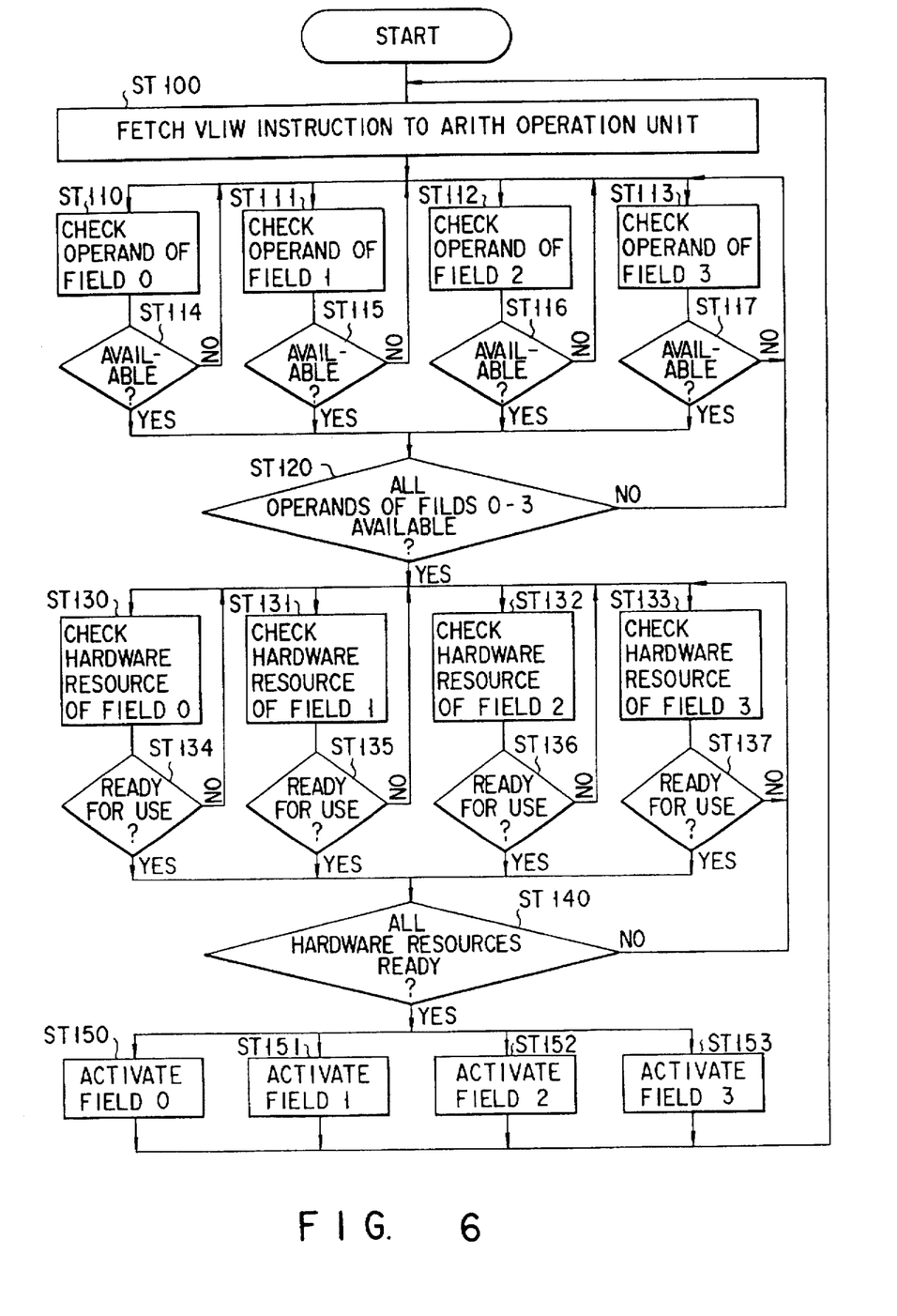
FIG. 6 is a flow chart for exemplifying the flow of VLIW parallel arithmetic processing according to the present invention.

FIG. 6 is a flow chart for explaining the flow of the parallel arithmetic processing exemplified in FIG. 3 in hardware.

Assume that instruction word 1 in FIG. 3 is fetched by hardware (parallel arithmetic operation unit) (ST100). With this fetch operation, "Add", "Sub", "Add", and "Sub" in instruction word 1 are simultaneously (or synchronously) input to four pipelines in fields 0 to 3.

In fields 0 to 3, it is checked if the operands (addresses or data to be referred to by an instruction word; in this case, register numbers Rj of a register file to be referred to by the pipelines; j=1 to 8, for example) of the input instructions (Add, Sub, Add, Sub) are available (ST110 to ST113). Since the arithmetic operations are just started, all the operands (R1 to R4) of fields 0 to 3 required by the supplied instructions (Add, Sub, Add, Sub) are available (YES in ST114 to ST117).

If it is determined that all the operands of fields 0 to 3 are available (YES in ST120), it is checked if hardware resources (currently available registers in the register file) required for the arithmetic operations of fields 0 to 3 are ready for use (ST130 to ST133). Since the arithmetic operations are just started, all the hardware resources are ready for use (YES in ST134 to ST137).

If it is determined that all the hardware resources of fields 0 to 3 are ready for use (YES in ST140), the processing operations of the input instructions (Add, Sub, Add, Sub) are simultaneously started in fields 0 to 3 (ST150 to ST153).

With the above-mentioned processing, processing for instruction word 1 in FIG. 3 is completed by one clock.

Then, instruction word 2 in FIG. 3 is fetched by hardware (ST100). With this fetch operation, instructions "Add", "Sub", "Add", and "Div" of instruction word 2 are input to the four pipelines of fields 0 to 3.

In fields 0 to 3, it is checked if the operands of the input instructions (Add, Sub, Add, Div) are available (ST110 to ST113). Since the processing of instruction word 1 is completed by one clock, and the operand (register R8) to be referred to by the instruction "Div" of field 3 is unused, all the operands (R1 to R4, R8) required by the instructions (Add, Sub, Add, Div) input to fields 0 to 3 are available (YES in ST114 to ST117).

If it is determined that all the operands of fields 0 to 3 are available (YES in ST120), it is checked if hardware resources required for the arithmetic operations of fields 0 to 3 are ready for use (ST130 to ST133). Since the hardware resources required by the input instructions (Add, Sub, Add, and Div) are not used by other instructions, all the hardware resources are ready for use (YES in ST134 to ST137).

If it is determined that all the hardware resources of fields 0 to 3 are ready for use (YES in ST140), the processing operations of the input instructions (Add, Sub, Add, Div) are simultaneously started in fields 0 to 3 (ST150 to ST153).

In this manner, instruction word 2 in FIG. 3 is processed.

Then, instruction word 3 in FIG. 3 is fetched (ST100). With this fetch operation, instructions "Add", "Mul", and "Add" of instruction word 3 are input to three pipelines of fields 0 to 2. (Since a compiler that generated the processing program shown in FIG. 3 knows that the instruction "Div" input in field 3 in instruction word 2 requires a long processing time, no new instruction is input to field 3 at this time.)

In fields 0 to 2, it is checked if the operands of the input instructions (Add, Mul, Add) are available (ST110 to ST113). In this case, field 3 is still processing the instruction "Div" of instruction word 2, and the processing of the instruction "Div" is being performed in two ALUs of field 3. For this reason, the operands (R3, R4) of field 3 are not in use, and are available (YES in ST117). Since fields 0 to 2 of instruction word 2 simultaneously complete their processing operations by one clock, all the operands (R1 to R4) of fields 0 to 2 required by the input instructions (Add, Mul, Add) are available (YES in ST114 to ST116).

If it is determined that all the operands of fields 0 to 3 are available (YES in ST120), it is checked if hardware resources required for the arithmetic operations of fields 0 to 3 are ready for use (ST130 to ST133).

In this case, the instruction "Mul" which is being processed in field 1 uses the resource (register R4), and this resource (register R4) is to be referred to by the instruction "Add" of field 2. For this reason, a hardware resource required for the arithmetic operation of field 2 is not available (NO in ST136). Thus, field 2 waits by executing an instruction "NOP" for executing nothing until this resource (register R4) is released (i.e., until execution of the instruction "Mul" of field 1 is ended) (loop of ST132 and ST136).

At this time, the instruction "Add" of field 2 also refers to the resource (register R3) used by the instruction "Add" of field 0. For this reason, while field 2 is waiting by executing the instruction "NOP" (one clock) until the execution of the instruction "Mul" of field 1 is ended, field 0 also waits by executing the instruction "NOP" (one clock) (loop of ST130 and ST134).

If it is determined that all the hardware resources of fields 0 to 3 are ready for use by inserting the instructions "NOP" in fields 0 and 2 (YES in ST140), the input instructions (Add, Mul, Add), and the instruction (Div) still being executed are parallel processed in fields 0 to 3 for two clocks (ST150 to ST153).

In this manner, instruction word 3 in FIG. 3 is processed.

Then, instruction word 4 in FIG. 3 is fetched by hardware (ST100). With this fetch operation, instructions "Add", "Sub", and "Add" of instruction word 4 are input to three pipelines of fields 0 to 2. (Since the compiler that generated the processing program shown in FIG. 3 knows that the instruction "Div" input in field 3 in instruction word 2 requires a long processing time, no new instruction is input to field 3 in this case.)

In fields 0 to 2, it is checked if the operands of the input instructions (Add, Sub, Add) are available (ST110 to ST113). Since fields 0 to 2 of instruction word 3 complete parallel processing for two clocks, all the operands (R1 to R4) of fields 0 to 2 required by the input instructions (Add, Sub, Add) are available (YES in ST114 to ST116). Since field 3 is still processing the instruction "Div" of instruction word 2 using the ALUs of field 3, the operands (R3 and R4) to be referred to by this instruction "Div" are also available (YES in ST117).

If it is determined that all the operands of fields 0 to 3 are available (YES in ST120), it is checked if hardware resources required for the arithmetic operations in fields 0 to 3 are ready for use (ST130 to ST133). Since the hardware resources required by the input instructions (Add, Sub, Add) and the instruction (Div) still being executed are not in use, all the hardware resources are ready for use (YES in ST134 to ST137).

If it is determined that all the hardware resources of fields 0 to 3 are ready for use (YES in ST140), the parallel processing operations of the input instructions (Add, Sub, Add) and the instruction (Div) still being executed are simultaneously performed in fields 0 to 3 (ST150 to ST153).

In this manner, instruction word 4 shown in FIG. 3 is processed.

Figure 7:
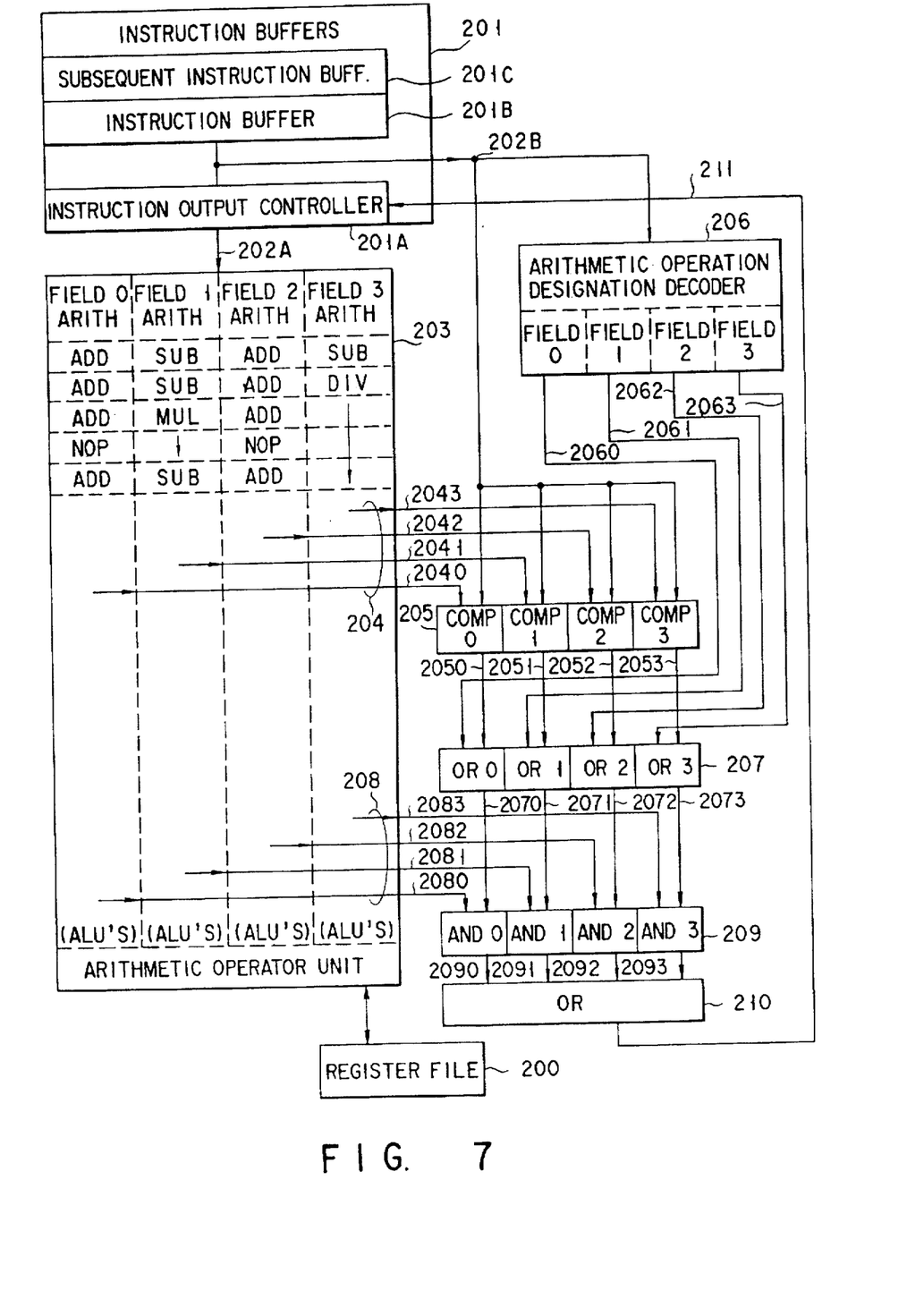
FIG. 7 is a block diagram showing a VLIW parallel arithmetic processing system according to an embodiment of the present invention.

FIG. 7 is a functional block diagram of an embodiment of the present invention. The system shown in FIG. 7 comprises VLIW instruction buffers 201 for storing instruction words each including a plurality of (four) arithmetic operations, as shown in FIG. 1, arithmetic operator unit 203 for reading out a VLIW stored in instruction buffers 201 through signal line 202A, and parallel processing four arithmetic operations included in the readout VLIW, and register comparator 205 for fetching register number Rj (e.g., j=1 to 8) of register file 200 for storing the results of currently executed arithmetic operations through signal line 204i (i=0, 1, 2, or 3), fetching a register number to be referred to by a VLIW to be executed next through signal line 202B, and comparing the fetched register numbers to check if the two register numbers coincide with each other.

First, the specific elements in the embodiment of FIG. 7 will be briefly described.

VLIW Instruction buffers 201

Buffers 201 are provided for storing a plurality of VLIW instructions, and include instruction output controller 201A, instruction buffer 201B, and subsequent instruction buffer 201C. Controller 201A serves to output the VLIW from buffer 201B in response to signal 211. Buffer 201C stores a subsequent VLIW to be executed next to the VLIW in buffer 201B.

Arithmetic Operator Unit 203

Unit 203 is provided for parallel executing a plurality of instructions (arithmetic operations) contained in the VLIW, and is formed of four pipelines (fields 0–3). Each pipeline is provided with, for example, two ALUs (arithmetic logic units) for executing the instruction of the VLIW.

Register File 200

Register file (hardware resource) 200 is provided for storing the results of the arithmetic operations executed in the fields 0–3 of unit 203.

Register Comparator 205

Comparator 205 fetches register number Rj of file (hardware resource) 200, to which the result of the arithmetic operation is stored, and the register number which is referred to by a subsequent VLIW to be executed next. Then, comparator 205 compares register number Rj with the register number of the subsequent VLIW, and checks whether the former matches the latter.

In other words, comparator 205 checks the register number so as to inspect a state of the hardware resource which is used by unit 203.

When register number Rj of field i (i=0, 1, 2, or 3) matches the register number of the subsequent VLIW, corresponding output 205i (i=0, 1, 2, or 3) of comparator 205 becomes "1". If the former does not match the latter, corresponding output 205i becomes "0".

Arithmetic Operation Designation Decoder 206

Decoder 206 fetches the subsequent VLIW to be executed next, and detects a specific field of unit 203 in which a no-operation (NOP) instruction is present.

When the NOP is detected at a specific field i (i=0, 1, 2, or 3), the corresponding output 206i of decoder 206 becomes "0". When an arithmetic operation other than the NOP is detected at a specific field i (i=0, 1, 2, or 3), the corresponding output 206i of decoder 206 becomes "1". When decoder 206 outputs 206i="1", execution of the subsequent VLIW in field i is prevented unless the execution of the arithmetic operation other than the NOP is completed in field i.

In other words, decoder 206 outputs 206i="0" when it detects in field i the NOP of the VLIW.

OR Circuit 207

OR circuit 207 provides a logical sum (OR signal 207i) of output 205i from comparator 205 and output 206i from decoder 206.

More specifically, circuit 207 provides OR signal 207i= "1" if:

1) the subsequent VLIW to be executed next designates an arithmetic operation other than the NOP in field i (i.e., the subsequent VLIW to be executed next actually uses the hardware resource of field i; 206i="1"); or 2) register number Rj for storing the result of the arithmetic operation in field i matches the register number to be referred to by the subsequent VLIW to be executed next (i.e., the register for storing the result of the arithmetic operation is used by the subsequent VLIW).

Signal 208i

Signal 208i becomes "1" when the arithmetic operation of field i is not yet completed during the operation cycle of the current instruction. For instance, during the division operation in field 3 of instruction word 2, signal 2083 is "1".

When the arithmetic operation of field i is completed, signal 208i becomes "0".

AND Circuit 209

AND circuit 209 provides a logical product (AND signal 209i) of output 207i from OR circuit 207 and signal 208i from unit 203.

More specifically, circuit 209 provides AND signal 209i= "1" if the following conditions are established simultaneously:

1) OR circuit 207 provides 207i="1" since the hardware resource is used by the subsequent VLIW, or the register for storing the result of the arithmetic operation is referred to by the subsequent VLIW; and 2) signal 208i is "1" since the current arithmetic operation in field i is not yet completed during the operation cycle thereof.

Note that AND signal 209i="1" means that the execution of the subsequent VLIW should be suspended until the current arithmetic operation in field i is completed.

OR Circuit 210

OR circuit 210 supplies signal 211="1" to controller 201A when signal 209i (or at least one of signals 2090–2093) is "1", and the subsequent VLIW is prevented from being supplied to unit 203.

More specifically, circuit 210 provides signal 210="1" if the following conditions are established:

1) an arithmetic operation other than the NOP is executed in field i (206i="1"), or the register for storing the result of the current arithmetic operation is referred to by the subsequent VLIW (205i="1"); and 2) the current arithmetic operation is not yet completed in field i (208i="1").

Figure 5:
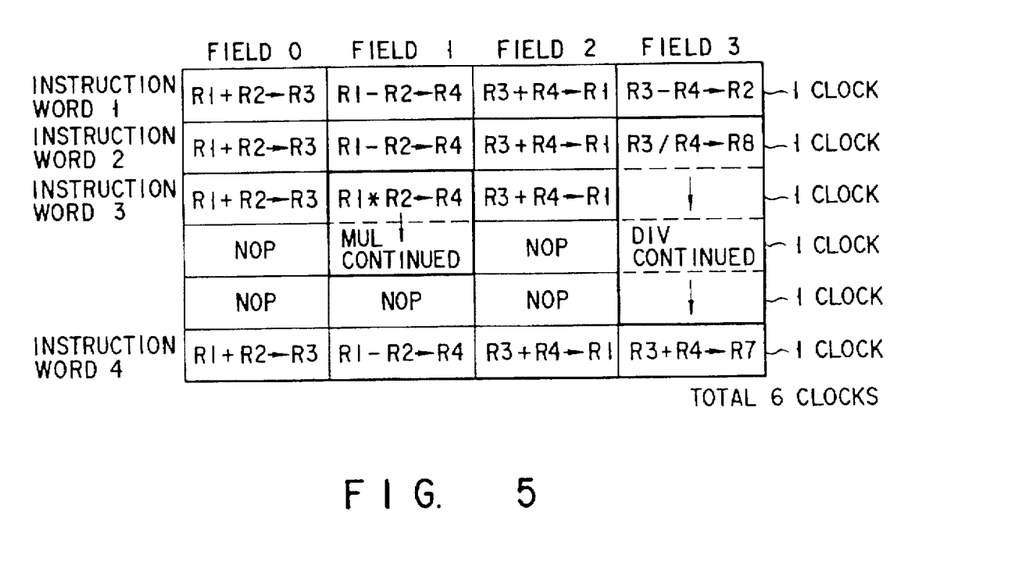

When the above conditions are established, the subsequent VLIW is prevented from being supplied to unit 203, so that NOPs are inserted by the apparatus of FIG. 7 to instruction word 3 shown in FIG. 5.

Incidentally, when all arithmetic operations of field i are completed, signal 208i="0" is obtained. In this case, signal 211 becomes "0", and the subsequent VLIW can be supplied to unit 203.

NOP inserted by compiler and NOP inserted by apparatus of FIG. 7

The term "NOP" is an abbreviation of "No Operation." An instruction "NOP" does execute nothing but consume one clock for execution.

Figure 4:
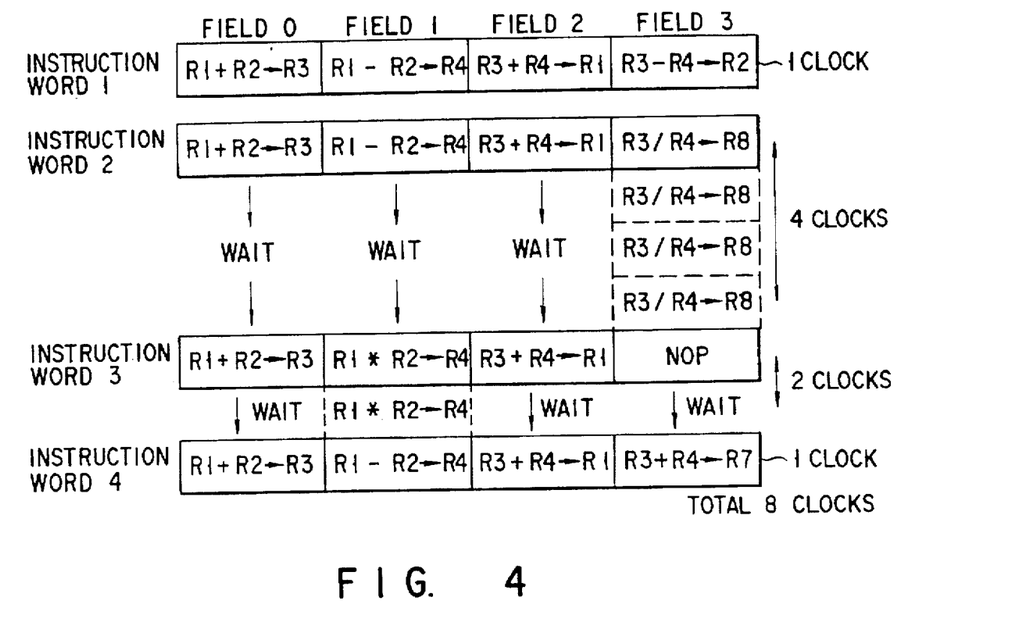

Note that each NOP at instruction word 3, field 3 and instruction word 4, field 3 shown in FIG. 2, and NOP at instruction word 3, field 3 shown in FIG. 4, are inserted into instruction words 1–4 by a compiler of the VLIW. These NOPs can be detected by decoder 206 in FIG. 7. On the other hand, each NOP at instruction word 3, fields 0, 2 (second clock) shown in FIG. 3, and each NOP at instruction word 3, fields 0–2 (second and third clocks) shown in FIG. 5, are inserted by operation of the apparatus of FIG. 7. In other words, the NOPs in FIGS. 3 and 5 are not produced by the compiler of the VLIW.

NOP can be used to compensate for a time lag of completing the execution among instructions in the VLIW, when these instructions require different number of clocks to complete their executions. An instruction other than NOP can also be used to compensate for the above time lag, if such a non-NOP instruction does not run away the VLIW currently executed, nor produce errors in the result of execution of the VLIW.

According to an example of FIG. 3, two NOPs are added to the one-clock instructions (ADD) in fields 0 and 2 of instruction word 3 in order to compensate for the execution completion timing lag with respect to the two-clock instruction (MUL) in field 1 of instruction word 3.

Similarly, according to an example of FIG. 5, four NOPs are added to the one-clock instructions (ADD) in fields 0 and 2 of instruction word 3 in order to compensate for the execution completion timing lag with respect to the four-clock instruction (DIV) in field 3 of instruction word 2, and one NOP is added to the two-clock instruction (MUL) in field 1 of instruction word 3 in order to compensate for the execution completion timing lag with respect to the four-clock instruction (DIV) in field 3 of instruction word 2.

It should be noted that FIGS. 4 and 5 exemplify a case wherein a non-NOP instruction (ADD; R3+R4=R7) is arranged at field 3 of instruction word 4, and DIV at field 3 of instruction word 2 (fourth clock) cannot be overlapped to the non-NOP instruction (ADD) at field 3 of instruction word 4.

In this case, the non-NOP instruction (ADD) at field 3 (i=3) of instruction word 4 is detected by decoder 206 (206i="1" and 207i="1", or signal 2063="1" and signal 2073="1"), while the current execution of DIV at field 3 of instruction word 2 is detected by signal 208i="1" (i=3; 2083="1"), so that signal 211="1" is produced, thereby suspending supply of instruction word 4 to unit 203.

In the example of FIG. 3, the two NOPs added to the one-clock instructions (ADD) in fields 0 and 2 of instruction word 3 are produced by the above supply-suspension of instruction word 4. Again, note that the NOPS exemplified in FIG. 3 are not given by a compiler (or an assembler programmer) which produces instruction words 1–4 of FIG. 2.

In short, according to the embodiment of FIG. 7, when controller 201A receives signal 211="1" and suspends the supply of VLIW to unit 203, NOP(s) is (are) inserted to each of the fields (e.g., fields 0 and 2 of instruction word 3) in which execution of the instruction (ADD) has been completed. By the insertion of such a NOP, the execution of each of the NOP-inserted fields (fields 0 and 2) is completed just when the NOP-not-inserted field(s) (field 1 of instruction word 3, field 3 of instruction word 2) is (are) completed.

Figure 8A:
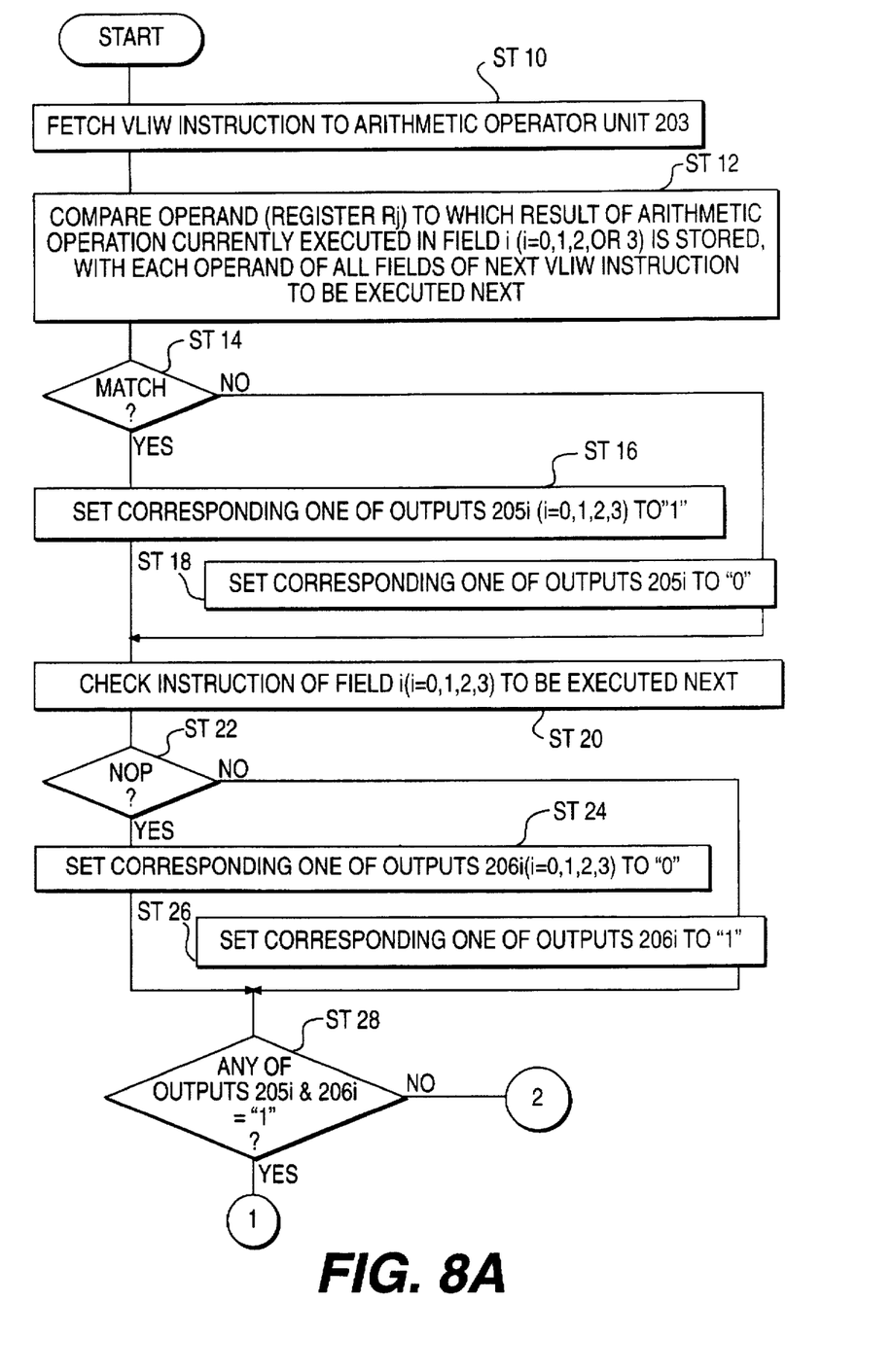
FIGS. 8A and 8B are flow charts for explaining the operation of the VLIW parallel arithmetic processing system shown FIG. 7.
Figure 8B:
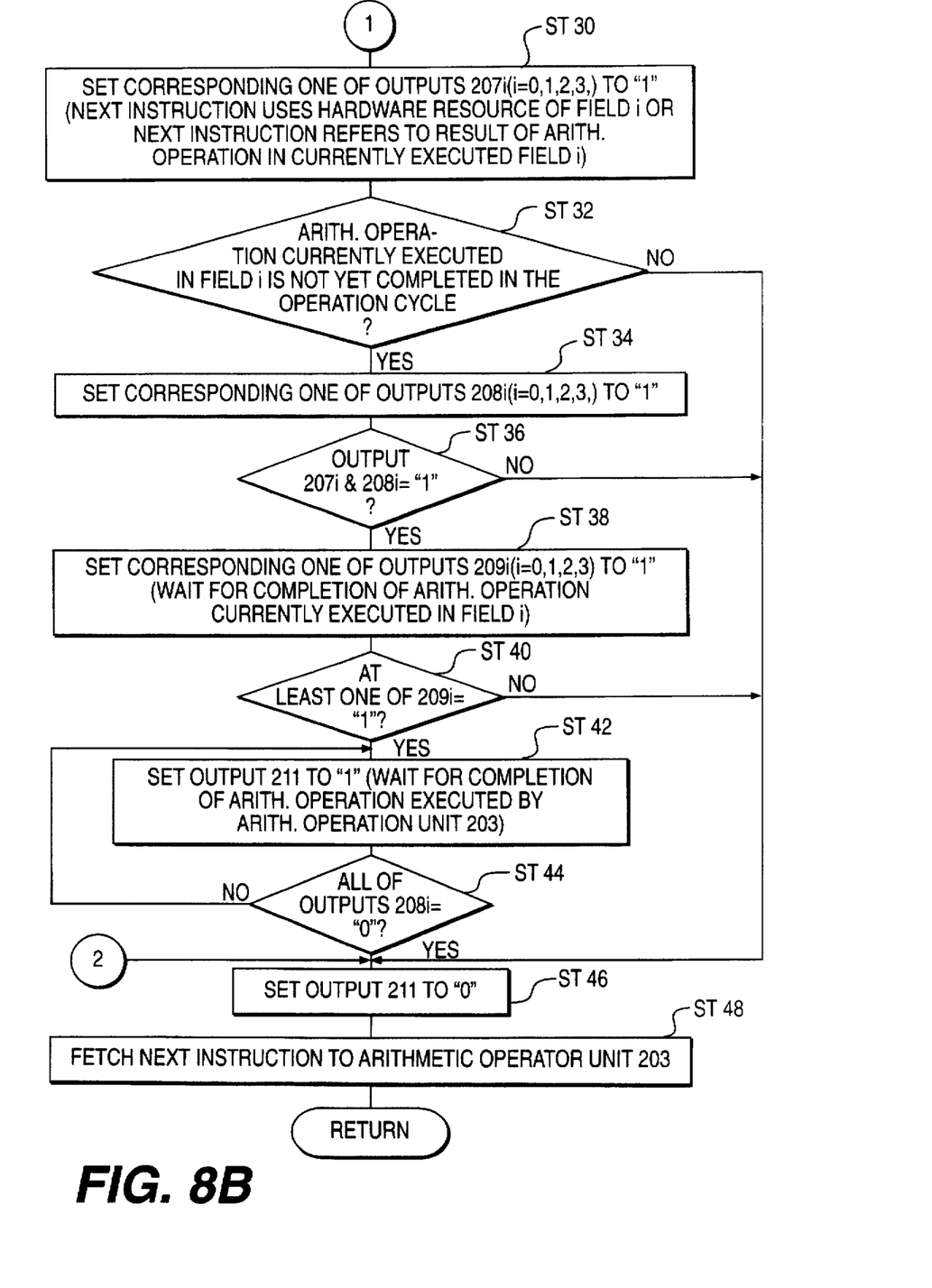

The operation of the VLIW arithmetic processing system with the above arrangement will be described below with reference to FIGS. 8A and 8B. (This operation is executed not by a microprogram but by a hardware logic.)

The characteristic feature of the VLIW arithmetic processing system of this embodiment is as follows. Parallel processing of a plurality of instruction words is allowed in principle. The register number (operand) of register file 200 for storing the arithmetic operation results of a currently executed instruction word is compared with the register numbers (operands) referred to by an instruction word to be executed next. As a result of comparison, when a coincidence between the two register numbers is found, and an arithmetic operation, the result of which is to be stored in the register having the coinciding register number, is not completed yet, an instruction fetch operation from instruction buffers 201 to arithmetic operator unit 203 is waited.

When one VLIW is fetched from instruction buffers 201 to arithmetic operator unit 203 through signal line 202A (ST10), and arithmetic processing is started, comparator 205 fetches a register number (Rj) of register file 200 for storing the result of a currently executed arithmetic operation through signal line 204i, and also fetches, from instruction buffer 201B, register numbers to be referred to by all the instruction words included in a VLIW to be executed next through signal line 202B. Comparator 205 then checks a coincidence between these fetched register numbers (ST12).

In comparator 205, four blocks 0 to 3 thereof correspond to fields 0 to 3 of arithmetic operator unit 203. One block i (i=0, 1, 2, or 3) checks if a register number of a register, which stores the result of the currently executed arithmetic operation in field i, coincides with each of all the register numbers to be referred to by instruction words in the next VLIW. If a coincidence is found (YES in ST14), corresponding output i of comparator 205 goes to logic "1" (ST16); otherwise (NO in ST14), corresponding output i goes to logic "0" (ST18). Coincidence detection result 205i of the comparison is input to one input terminal of each of OR gates 0 to 3 of OR circuit 207. The other input terminal of each of OR gates 0 to 3 of OR circuit 207 receives output 206i from arithmetic operation designation decoder 206. Thus, each of the OR gates logically ORs the two inputs.

Arithmetic operation designation decoder 206 detects an instruction "NOP", and field i in which this is arithmetic operation is designated, in an instruction word to be executed next (ST20). If an instruction "NOP" is detected (YES in ST22), decoder 206 supplies output 206i of logic "0" to the OR gate corresponding to field i for executing "NOP" (ST24). If no "NOP" is detected (NO in ST22), output 206i goes to logic "1" (ST26).

If any of outputs 205i and 206i is "1" (YES in ST28), corresponding output 207i from a corresponding one of OR gates 0 to 3 of OR circuit 207 goes to logic "1" (ST30). Output 207i (i=0, 1, 2, or 3)="1" means that "an instruction word to be executed next is other than "NOP", and uses a hardware resource for field i", or "an instruction word to be executed next refers to the result of an arithmetic operation currently executed in field i". This output 207i is input to one input terminal of the corresponding AND gate of AND circuit 209.

On the other hand, if it is determined that an arithmetic operation currently executed in field i is not ended in the corresponding processing cycle (YES in ST32), output 208i of non-ended field i goes to logic "1" (ST34). This output 208i is supplied to the other input terminal of the corresponding AND gate of AND circuit 209.

If both outputs 207i and 208i for field i are "1" (YES in ST36), output 209i from the AND gate of AND circuit 209 corresponding to field i goes to logic "1". Output 209i="1" means "wait for completion of the arithmetic operation currently executed in field i".

If output 209i of any of AND gates 0 to 3 of AND circuit 209 is at logic "1" (YES in ST40), the output from OR circuit 210 goes to logic "1" (ST42), and a wait signal "1" is supplied to output controller 201A of instruction buffers 201 through signal line 211. Thus, instruction buffers 201 stop simultaneous transfer of a VLIW to arithmetic operator unit 203.

When all the arithmetic operations in fields 0 to 3 are completed, all outputs 208i go to logic "0" (YES in ST44). Thus, since all outputs 209i from AND circuit 209 go to logic "0" regardless of outputs 207i from OR circuit 207, the output on signal line 211 also goes to logic "0" (ST46). The instruction transfer inhibition state by instruction output controller 201A is canceled, and the next VLIW in buffer 201B is fetched by arithmetic operator unit 203 (ST48).

In this manner, in the VLIW arithmetic processing system of this embodiment, assuming that instruction words 1 to 4 shown in FIG. 2 are stored in instruction buffers 201, and are to be sequentially executed, the following processing is realized. That is, upon examination of the reference relationship among arithmetic operator units in instruction words 2, 3, and 4 on the compiler level, a total of four arithmetic operations, i.e., two additions, one subtraction, and one division are executed in instruction word 2, and arithmetic operation results are stored in registers R1, R3, R4, and R8. Of these registers, registers R1, R3, and R4 are read out by instruction word 3. However, register R8 is referred to by neither instruction word 3 nor instruction word 4. Since register R8 stores the division result, the division processing requires four clocks. In this case, execution of instruction words 3 and 4 need not be waited until completion of the division.

Then, instruction word 3 executes a total of three arithmetic operations, i.e., two additions and one multiplication, and stores the results of these arithmetic operations in registers R1, R3, and R4. These registers R1, R3, and R4 are read out by instruction word 4. In particular, since register R4 for storing the multiplication result is referred to by instruction word 4, execution of instruction words 3 and 4 must be waited until completion of the multiplication in instruction word 3 although instruction word 4 is executed immediately after instruction word 3.

Therefore, when instruction words 1 to 4 shown in FIG. 2 are to be sequentially processed, instruction words 3 and 4 can be executed during execution of the division in instruction word 2, as shown in FIG. 3. In this case, since instruction word 4 refers to the multiplication result of instruction word 3, instruction word 4 is executed after the multiplication result of instruction word 3 is obtained, and instruction words 3 and 4 require a total execution time of 3 clocks. Since these instruction words are executed parallel to the division of instruction word 2, instruction word 4 is completed simultaneously with completion of instruction word 2.

In this manner, when instruction words 1 to 4 shown in FIG. 2 are executed, the processing contents and execution times as shown in FIG. 3 are obtained. In FIG. 3, the total sum of processing times (the number of required clocks) of instruction words 1 to 4 is 5 smaller by 3 clocks than 8 clocks of FIG. 2.

When instruction words 1 to 4 shown in FIG. 4 are to be sequentially processed, the processing contents and execution times as shown in FIG. 5 are obtained. In FIG. 2, an instruction "NOP" is executed in field 3 of instruction word 4, while in FIG. 4, an addition is designated in field 3 of instruction word 4. Other contents of the instruction words shown in FIG. 4 are the same as those in FIG. 2.

The influence of a difference in field 3 of the instruction word on the processing will be described below. Arithmetic operator unit 203 can perform one of addition/subtraction/ multiplication/division/NOP for each of fields 0 to 3. In this case, each field can perform one arithmetic operation. Thus, instruction word 4 shown in FIG. 4 cannot be executed until the division in field 3 of instruction word 2 is completed. For this reason, when an arithmetic operator unit, which is executing a preceding arithmetic operation, is to be used by the following instruction, control must be made to cause the following arithmetic operation to wait until the preceding arithmetic operation is completed. Thus, execution of instruction word 4 in FIG. 4 should be started after the division of instruction word 2 is completed. When instruction words 1 to 4 shown in FIG. 4 are sequentially processed under such control, the processing contents are as shown in FIG. 5, and the total execution time of instruction words 1 to 4 corresponds to 6 clocks.

If each of fields 0 to 3 of arithmetic operator unit 203 can simultaneously execute a plurality of different arithmetic operations, instruction word 4 in FIG. 4 can be executed parallel to the division of instruction word 2. Therefore, the total execution time of the instruction words shown in FIG. 4 can be 5 clocks as in the case of FIG. 3. However, in consideration of realization of hardware, it is technically difficult to allow simultaneous execution of a plurality of different arithmetic operations.

When instruction words 1–4 as shown in FIG. 2 are input to the apparatus of FIG. 7, these instruction words 1–4 are executed in the order as shown in FIG. 3. In the following, the operation of the apparatus of FIG. 7 will be further described with reference to FIGS. 8A and 8B.

Assume that the four pipelines (i.e., fields 0–3) of arithmetic operator unit 203 are all empty at the initial stage of operation. Further, assume that each of the ADD, SUB, and NOP instructions is executed with one system clock, the MUL instruction is executed with two system clocks, and the DIV instruction is executed with four system clocks.

First, ADD and SUB instructions of instruction word 1 are input to field 0–3 of unit 203 simultaneously (ST10). These one-clock instructions are executed at the same time, using one clock. Thereafter, outputs 208i (2080–2083) of unit 203 become "0" (ST44, yes).

Then, ADD, SUB, and DIV instructions of instruction word 2 are input to field 0–3 of unit 203 simultaneously (ST48). The ADD and SUB instructions in fields 0–2 of instruction word 2 are executed with one clock, while complete execution of the DIV instruction in field 3 of instruction word 2 requires four clocks.

Completion of the one-clock ADD and SUB instructions in fields 0–2 of instruction word 2 (indicated by outputs 2080–2082="0"), uncompletion of the four-clock DIV instruction in field 3 of instruction word 2 (indicated by output 2083="1"), whether the subsequent instructions (of instruction word 3) to be executed next in fields 0–3 refer to the result of the currently executed instructions (comparison between output 202B and each of outputs 2040–2043), and whether the subsequent instructions (of instruction word 3) to be executed next in fields 0–3 include NOP (indicated by outputs 2060–2063), are detected by elements 205–210 in FIG. 7

More specifically, whether the subsequent instructions (of instruction word 3) to be executed next in fields 0–3 refer to the result of the currently executed instructions can be detected according to a result of comparison by comparator 205 (comparison between output 202B and each of outputs 2040–2043), and whether the subsequent instructions (of instruction word 3) to be executed next in fields 0–3 include NOP can be detected by decoder 206 (indicated by outputs 2060–2063).

Fields 0–3 of instruction word 3 do not refer to result R8 (contents of register number R8) of DIV in field 3 of instruction word 2 being executed currently (ST14, no). Therefore, with respect to fields 0–2, instruction word 3 can be fed to the preceding period (second to fourth clocks of instruction word 2) during which the DIV in field 3 of instruction word 2 is now executed (ST18; outputs 2050–2052="0"). Of course, NOP in field 3 of instruction word 3 does not refer to result R8 of DIV in field 3 of instruction word 2 being executed currently (ST18; outputs 2053="0").

Since NOP (produced by a compiler) in field 3 of instruction word 3 executes nothing, with respect to field 3, instruction word 3 can be fed to the preceding period during which the DIV in field 3 of instruction word 2 is now executed (output 2063="0", outputs 2060–2062="1"; ST28, yes). In this case, OR outputs 2070–2073="1" and output 2073="0" (ST30). Although ADD and SUB in fields 0–2 of instruction word 2 are completed with the first one clock of instruction word 2 (outputs 2080–2082="0"), DIV in field 3 of instruction word 2 is not yet completed (ST32, yes; ST34, output 2083="1").

In the above case, since outputs 2080–2082="0" and 2083="1" (ST34), and outputs 2070–2072="1" and 2073="0" (ST30), AND conditions of these outputs (207*i* and 208*i*; i=0, 1, 2, 3) are not established (ST36, no; outputs 2090–2093="0") so that OR output 211 becomes "0" (ST46). Then, the suspension of instruction fetch to unit 203 is canceled, and the instructions (ADD, MUL, ADD, NOP) of next instruction word 3 are simultaneously input to unit 203 (ST48).

With respect to instruction word 3, each ADD in fields 0 and 2 is executed completely with one clock, but complete execution of MUL in field 1 requires two clocks.

Completion of the one-clock ADD, SUB instructions in fields 0, 2 of instruction word 3 (indicated by outputs 2080="0", 2082="0"), uncompletion of the two-clock MUL instruction in field 1 of instruction word 3 (indicated by output 2081="1"), uncompletion of the four-clock DIV instruction in field 3 of instruction word 2 (indicated by output 2083="1"), whether the subsequent instructions (of instruction word 4) to be executed next in fields 0–3 refer to the result of the currently executed instructions (comparison between output 202B and each of outputs 2040–2043), and whether the subsequent instructions (of instruction word 4) to be executed next in fields 0–3 include NOP (indicated by outputs 2060–2063), are detected by elements 205–210 in FIG. 7.

More specifically, whether the subsequent instructions (of instruction word 4) to be executed next in fields 0–3 refer to the result of the currently executed instructions can be detected according to a result of comparison by comparator 205 (ST12–ST18), and whether the subsequent instructions (of instruction word 4) to be executed next in fields 0–3 include NOP can be detected by decoder 206 (ST20–ST26).

Since NOP (produced by a compiler) in field 3 of instruction word 4 executes nothing, with respect to field 3, instruction word 4 can be fed to the preceding period during which the DIV in field 3 of instruction word 2 is now executed (output 2063="0", outputs 2060–2062="1"; ST28, yes).

On the other hand, the instruction (R3+R4=R1) in field 2 of instruction word 4 refers to the results (R3, R4) of arithmetic operations (R1+R2=R3, R1–R2=R4) in fields 0 and 1 of instruction word 4 (ST14, yes). Then, with respect to field 2, instruction word 4 cannot be fed to the preceding period (second clock of instruction word 3) during which the MUL in field 1 of instruction word 3 is now executed (ST16; outputs 2050="1", 2051="1"). In this case, OR outputs 2070 and 2071="1" and OR outputs 2072 and 2073="0" (ST30).

Incidentally, if the instruction (R3+R4=R1) in field 2 of instruction word 4 is pre-fed to preceding field 2 of instruction word 3 (second clock of instruction word 3) during which the MUL in field 1 of instruction word 3 is not yet completed, the instruction (R3+R4=R1) in field 2 of instruction word 4 is executed using the result (R4) of SUB instruction in field 1 of instruction word 2, not using the result (R4) of MUL instruction in field 1 of instruction word 3, thereby causing errors.

Meanwhile, if the instruction (R1+R2=R3) in field 0 of instruction word 4 is pre-fed to preceding field 0 of instruction word 3 (second clock of instruction word 3), the instruction (R3+R4=R1) in field 2 of instruction word 4 is executed using the result (R3) of the pre-fed instruction in field 0 of instruction word 4, not using the result (R3) instruction word on in field 0 of instruction word 3, thereby also causing errors.

After elapsing the first one clock period of instruction word 3, the ADD instructions in fields 0 and 2 of instruction word 3 are completed (outputs 2080, 2082="0"). However, the MUL instruction in field 1 of instruction word 3 is not yet completed (ST32, yes; ST34, output 2081="1").

Note that in the above case, OR output 2071="1" and output 2081="1" (ST36, yes). Accordingly, AND output 2091 becomes "1" (ST38; ST40, yes), and signal 211 from OR circuit 210 becomes "1" (ST42).

At this time, the MUL instruction in field 1 of instruction word 3 as well as the DIV instruction in field 3 of instruction word 2 are not yet completed, so that outputs 2081 and 2083="1" (ST44, no). Then, signal 211="1" is held, or the input (or fetch) of respective instructions of subsequent instruction word 4 to fields 0–3 is suspended (ST42), unless the MUL instruction in field 1 of instruction word 3 is completed with two clocks so as to set outputs 2080–2082="0" and the DIV instruction in field 3 of instruction word 2 is completed with four clocks so as to set output 2083="0".

When the MUL instruction in field 1 of instruction word 3 and the DIV instruction in field 3 of instruction word 2 are completed, outputs 2080–2083="0" are provided (ST44, yes). Further, OR output 2073 is "0" because NOP is detected at field 3 of instruction word 3 (output 2063="0") and instruction word 4 does not refer to the resource (R8) of field 3 of instruction word 2 (output 2053="0"). Accordingly, all AND outputs 2090–2093 are "0", so that the suspension of instruction fetch to unit 203 is canceled and the instructions (ADD, SUB, ADD, NOP) of next instruction word 4 are simultaneously input to unit 203 (ST48).

Completion of the one-clock ADD, SUB, ADD, and NOP instructions in fields 0–3 of instruction word 4 (indicated by outputs 2080–2083="0"), whether the subsequent instructions (not existing in the example of FIGS. 2–3) to be executed next in fields 0–3 refer to the result of the currently executed instructions, and whether the subsequent instructions (not existing) to be executed next in fields 0–3 include NOP, are detected by elements 205–210 in FIG. 7

More specifically, whether the subsequent instructions (not existing) refer to the result of the currently executed instructions (of instruction word 4) can be detected according to a result of comparison by comparator 205 (ST12–ST18), and whether the subsequent instructions (not existing) include NOP can be detected by decoder 206 (ST20–ST26).

The instructions (not existing) subsequent to instruction word 4 do not refer to the results of instructions in fields 0–3 of instruction word 4 (ST14, no; outputs 2050–2053="0"). Also, the instructions (not existing) subsequent to instruction word 4 do not contain NOP (ST22, no; outputs 2060–2063="1"). In this case (ST28, yes), OR outputs 2070–2073 become "1".

When the instructions in fields 0–3 of instruction word 4 are not yet completed (ST32, yes), outputs 2080–2083 are all "1" (ST34). Then, since OR outputs 2070–2073="1" (ST36, yes), all AND outputs 2090–2093 become "1" (ST38; ST40, yes), thereby inhibiting the instruction fetch (ST42, signal 211="1").

When the instructions in fields 0–3 of instruction word 4 are completed, outputs 2080–2083 are all "0" (ST44, yes), and all AND outputs 2090–2093 become "0". Then, the inhibition of the instruction fetch is canceled (ST46, signal 211="0"), thereby allowing the input (fetch) of subsequent instructions to unit 203 (ST48).

With the operation as mentioned above, instruction words 1–4 of FIG. 2 are completed using five clocks according to the processing of FIG. 3.

As described above, according to the embodiment of the present invention, when a register whose content is not determined since a preceding arithmetic operation is still being executed is to be referred to by the following instruction word, or when the following instruction word is to use an arithmetic operator unit which is still executing a preceding arithmetic operation, control for waiting execution of the following instruction word until the preceding arithmetic operation is completed and its result is determined is inserted. Otherwise, even when an arithmetic operation of a preceding instruction word is being executed, the following instruction word can be executed without waiting for the completion of the preceding instruction word unless necessary, thereby maximally utilizing the parallel processing performance.

Figure 9:
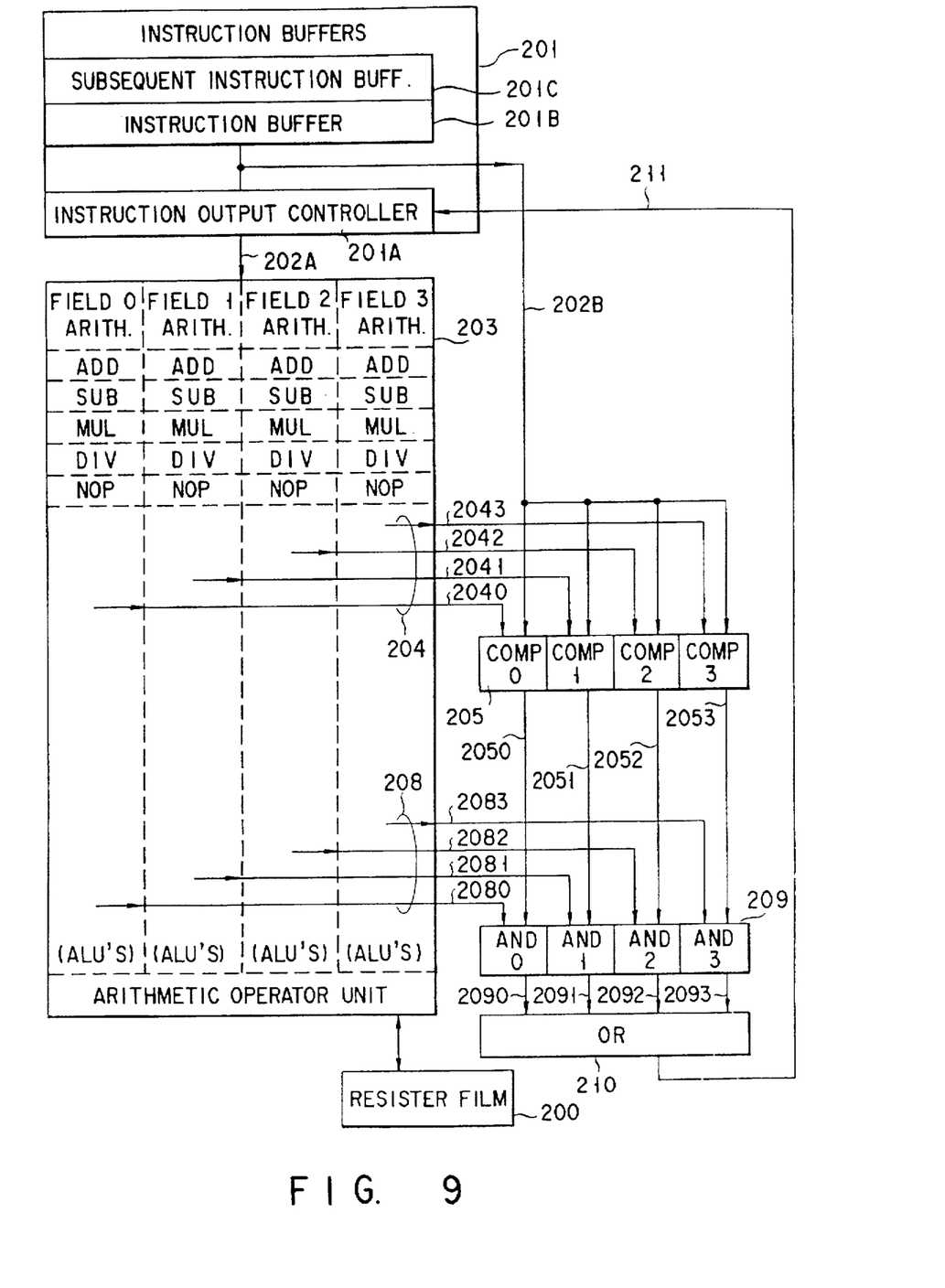
FIG. 9 is a block diagram showing a VLIW parallel arithmetic processing system according to another embodiment of the present invention.

FIG. 9 shows a VLIW parallel processing system according to another embodiment of the present invention. In the embodiment shown in FIG. 9, the arrangement (arithmetic operation designation decoder 206) for detecting an instruction "NOP" from a VLIW to be executed next is omitted from the embodiment shown in FIG. 7.

In the arrangement shown in FIG. 9, the following control is executed in consideration of the reference relationship of operands by a VLIW on the compiler level, thereby assuring parallelism of processing in fields 0 to 3.

More specifically, when a preceding arithmetic operation (e.g., a multiplication), an arithmetic operation result of which is to be stored in an operand (register number) to be referred to by a given instruction word, is not completed yet, control is made to wait for its completion; otherwise, even when a preceding arithmetic operation (e.g., a division), which is being processed, remains, control is made to execute the following instruction parallel to the arithmetic operation which is being processed.

Thus, in the example in FIG. 3, during division processing in field 3, other arithmetic processing operations can be parallel executed in fields 0 to 2. In other words, in an operand fetch stage of a VLIW, instruction words are synchronously input to all the fields. However, in execution stages of these instruction words, independent parallel processing operations in units of fields are performed, thereby minimizing idle times of execution units (e.g., ALUS) of each field.

The example of FIG. 4 is equivalent to that of FIG. 2, except that NOP in field 3 of instruction word 4 of FIG. 2 is changed to ADD instruction (R3+R4=R7) in field 3 of instruction word 4 of FIG. 4. Further, the embodiment of FIG. 9 is equivalent to that of FIG. 7, except that FIG. 9 lacks decoder 206 of FIG. 7.

Since the embodiment of FIG. 9 lacks decoder 206, it cannot detect NOP in field 3 of instruction word 3 of FIG. 4. In this case, the embodiment of FIG. 9 should assume that the instruction in field 3 of instruction word 3 could be a non-NOP instruction which cannot be fed to the processing period (fourth clock) of DIV instruction in field 3 of instruction word 2.

However, since fields 0–2 of instruction word 3 (FIG. 4) do not refer to the result (R8) of arithmetic operation in field 3 of instruction word 2 (FIG. 4), it is possible to pre-feed fields 0–2 of instruction word 3 to free fields 0–2 of instruction word 2. Such an instance can be detected by elements 205–210 in FIG. 9.

Due to the above pre-feed of fields 0–2 of instruction word 3, instruction word 3 containing the two-clock instruction (MUL) can be apparently executed with only one clock. After all, the apparatus of FIG. 9 can complete the execution of instruction words 1–4 using seven clocks which is smaller by one clock than eight clocks required in the conventional case of FIG. 4.

As described above, according to the present invention, when a register number of a register, which stores a result of an arithmetic operation of a preceding instruction word, is to be referred to by an arithmetic operation in the following instruction word (or when an arithmetic operator which is in use for an arithmetic operation of the preceding instruction word is to be used by an arithmetic operation of the following instruction word), the following instruction word is executed after the arithmetic operation of the preceding instruction word is completed; otherwise, the following instruction word is parallel executed without waiting for completion of the arithmetic operation of the preceding instruction word. Therefore, the parallel processing performance of the arithmetic processing system can be maximally utilized, and high-speed arithmetic processing can be attained as a whole.

When software is programmed so that an arithmetic operation of another instruction word, which refers to a result of an arithmetic operation requiring a long arithmetic processing time, is separated from an instruction word for executing the arithmetic operation, the processing performance of the system can be further improved.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

What is claimed is:

1. A parallel processing system having an arithmetic operation unit for executing Very Large Instruction Words (VLIW), comprising:

an instruction buffer for holding a current VLIW being executed and a next VLIW to be executed after the current VLIW, the current VLIW and the next VLIW each having a plurality of instructions therein;

comparator means, coupled to the instruction buffer, for comparing a register number containing a result of an arithmetic operation for each instruction in the current VLIW with each register number referred to by the instructions in the next VLIW and for outputting a first signal indicating whether the result of an instruction of the current VLIW will be stored in a register to be used by an instruction of the next VLIW;

completion indication means for outputting a second signal indicating whether each of the instructions of the current VLIW has completed execution;

instruction output controller means, coupled to the comparator means, the completion indication means, and the instruction buffer, for outputting the next VLIW in the instruction buffer to the arithmetic operation unit when the first signal indicates that the result of the current VLIW will not be stored in the register to be used by the next VLIW or when the second signal indicates that execution of each instruction of the current VLIW has been completed; and means for stopping the output of the next VLIW from the instruction buffer upon detection of a no-operation state thereby delaying execution of the next VLIW for an instruction cycle.

2. The parallel processing system of claim 1, further including logical operation means for performing a logical operation on the signals from the comparator means and the completion indication means and for outputting a result signal to the instruction output controller means.

3. The parallel processing system of claim 2, wherein the logical operation means includes AND operation means for determining the logical AND of the first and second signals.

4. The parallel processing system of claim 3, wherein the logical operation means further includes logical OR operation means for performing a logical OR operation on output of the AND operation means.

5. The parallel processing system of claim 1 further including a memory connected to the comparator means.

6. The parallel processing system of claim 1, wherein:
the instructions of the next VLIW are executed in parallel when the first signal indicates that an instruction of the current VLIW will not be stored in a register to be used by an instruction of the next VLIW.

7. A parallel processing system having an arithmetic operation unit for executing Very Large Instruction Words (VLIW), comprising:

an instruction buffer for holding a current VLIW being executed and a next VLIW to be executed after the current VLIW, the current VLIW and the next VLIW each having a plurality of instructions;

arithmetic operations designation decoder means, coupled to the instruction buffer, for outputting a first signal indicating whether an instruction of the current VLIW is a no-operation instruction;

comparator means, coupled to the instruction buffer, for comparing a register number containing a result of an arithmetic operation for each instruction in the current VLIW with each register number referred to by the instructions in the next VLIW, and for outputting a second signal indicating whether the result of an instruction of the current VLIW will be stored in a register to be used by an instruction of the next VLIW;

completing indication means for outputting a third signal indicating that each of the instructions of the current VLIW has not yet completed execution;

instruction output controller means, coupled to the arithmetic operations designation decoder means, the comparator means; the completion indication means, and the instruction buffer, for outputting the next VLIW in the instruction buffer to the arithmetic operation unit when the first signal indicates that the result of the current VLIW will not be stored in the register to be used by the next VLIW or when the second signal indicates that execution of each instruction of the current VLIW has been completed; and means for stopping the output from the instruction buffer upon detection of a no-operation state thereby delaying execution of the next VLIW for an instruction cycle.

8. The parallel processing system of claim 7, further including logical operation means for performing a logical operation on the first signal from the arithmetic operations designation decoder means and the second signal from the comparator means.

9. The parallel processing system of claim 8, wherein the logical operation means includes logical OR operation means for performing a logical OR operation on the first signal of the arithmetic operations designation decoder means and second signal of the comparator means.

10. The parallel processing system of claim 7, further including logical operation means for performing a logical operation on the first signal from the arithmetic operations designation decoder means, the second signal from the comparator means, and the third signal from the completion indication means, and for outputting a result signal.

11. The parallel processing system of claim 10, wherein the logical operation means includes logical AND operation means for determining the logical AND of the first and second signals.

12. The parallel processing system of claim 11, wherein the logical operation means further includes logical OR operation means for performing a logical OR operation on output of the AND operation means.

13. The parallel processing system of claim 7 further including a memory connected to the comparator means.

14. The parallel processing system of claim 7, wherein:
the instructions of the next VLIW are executed in parallel when the second signal indicates that the result of an instruction of the current VLIW will not be stored in a register to be used by an instruction of the next VLIW.

15. A parallel processing system having an arithmetic operation unit for executing Very Large Instruction Words (VLIW), comprising:

an instruction buffer for holding a current VLIW and a next VLIW, the current VLIW and the next VLIW each having a plurality of instructions;

comparator means, coupled to the instruction buffer, for comparing a register number containing a result of an arithmetic operation for each instruction in the current VLIW with each register number referred to by the instructions in the next VLIW, and for determining when an instruction in the current VLIW should not be executed during a next instruction cycle when an instruction of the current VLIW requires more than one instruction cycle to execute;

instruction output controller means, coupled to the instruction buffer and the comparison means, for controlling output from the instruction buffer in accordance with the determination of the comparator means; and means for stopping the output from the instruction buffer upon detection of a no-operation state thereby delaying execution of the next VLIW for an instruction cycle.

16. The parallel processing system of claim 15, wherein:
the instructions of the next VLIW are executed in parallel when the comparator means determines that instructions of the current VLIW do not require more than one instruction cycle to execute.

17. A parallel processing system having an arithmetic operation unit for executing Very Large Instruction Words (VLIW), comprising:

an instruction buffer for holding a current VLIW being executed and a next VLIW to be executed after the current VLIW, the current VLIW and the next VLIW each having a plurality of instructions;

comparator means, coupled to the instruction buffer, for comparing a register number containing a result of an arithmetic operation for each instruction in the current VLIW with each register number referred to by the instructions in the next VLIW, and for determining when an instruction in the next VLIW should not be executed during a next instruction cycle because an instruction in the current VLIW requires a system resource also required by an instruction in the next VLIW; and instruction output controller means, coupled to the instruction buffer and the comparator means, for controlling output from the instruction buffer in accordance with the determination made by the comparator means and for stopping the output from the instruction buffer upon detection of a no-operation state thereby delaying execution of the next VLIW for an instruction cycle.

18. The parallel processing system of claim 17, wherein: the instructions of the next VLIW are executed in parallel when the comparator means determines that instructions in the current VLIW do not require a system resource also required by an instruction in the next VLIW.

19. A parallel processing system having an arithmetic operation unit for executing Very Large Instruction Words (VLIW), comprising:
   an instruction buffer for holding a current VLIW being executed and a next VLIW to be executed after the current VLIW, the current VLIW and the next VLIW each having a plurality of instructions;
   comparator means, coupled to the instruction buffer, for comparing a register number containing a result of an arithmetic operation for each instruction in the current VLIW with each register number referred to by the instructions in the next VLIW, and for determining when a second instruction in the current VLIW should not be executed during a next instruction cycle because a first instruction in the current VLIW required more than one instruction cycle to execute;
   instruction output controller means, coupled to the instruction buffer and the comparator means, for controlling output from the instruction buffer in accordance with the determination of the comparator means; and
   means for stopping the output from the instruction buffer upon detection of a no-operation state thereby delaying execution of the next VLIW for an instruction cycle.

20. The parallel processing system of claim 19, wherein: the instructions of the next VLIW are executed in parallel when the comparator means determines that instructions in the current VLIW do not require more than one instruction cycle to execute.

21. A parallel processing method for executing Very Large Instruction Words (VLIW) in an arithmetic operation unit, comprising the steps of:
   holding a current VLIW and a next VLIW, the current VLIW and the next VLIW each having a plurality of instructions;
   providing a first signal indicating whether a register number containing a result of an instruction of the current VLIW is the same as a register number to be used by an instruction of the next VLIW;
   generating a second signal indicating that an instruction of the current VLIW has not yet completed executing;
   controlling output from the instruction buffer in accordance with the first and second signals; and
   stopping the output from the instruction buffer upon detection of a no-operation state thereby delaying execution of the next VLIW for an instruction cycle.

22. The parallel processing method of claim 21, further including the step of:
   processing the instructions of the next VLIW in parallel when register numbers containing the respective results of instructions of the current VLIW are not the same as a register number to be used by an instruction of the next VLIW.

23. The parallel processing method of claim 21, further including the step of:

when the first signal indicates that the register numbers are the same, determining that the corresponding register can not be used by the next VLIW.

24. A parallel processing method adopting a very large instruction word (VLIW) architecture, for simultaneously processing a plurality of arithmetic operations, comprising the steps of:
   storing a VLIW including a plurality of instruction words;
   independently executing the instruction words of the VLIW;
   comparing a first register number identifying a result of an instruction word of the VLIW with second register numbers referred to by other instruction words of the VLIW, so as to provide a coincidence signal when one of the second register numbers coincide with the first register number;
   detecting an instruction word other than a non-operation instruction word from the instruction words which are stored by said storing step and are to be executed next, so as to provide an instruction detection signal when an instruction word other than the non-operation instruction word is detected;
   calculating a logical sum of the coincidence signal and the instruction detection signal;
   providing a logic state detection signal when the calculated logical sum is true;
   generating a non-end signal when execution of an instruction word is not ended in said executing step;
   calculating a logical product of the logic state detection signal and the non-end signal;
   outputting an instruction fetch inhibition signal when the calculated logical product is true or an instruction fetch signal when the calculated logical product is false;
   simultaneously transferring at least one instruction word of the VLIW from said storing step to said executing step when the instruction fetch signal is output and stopping transfer of an instruction word of the VLIW from said storing step to said executing step when the instruction fetch inhibition signal is output; and
   stopping the output from the instruction buffer upon detection of a no-operation state thereby delaying execution of a next VLIW for an instruction cycle.

25. The parallel processing method of claim 24, further including the step of:
   processing the instruction words in parallel when the first register number is not the same as one of the second register numbers.

26. The parallel processing method of claim 24, further including the step of:
   determining that a register corresponding to the first register number can not be used by the other instruction words when the coincidence signal is provided.

27. A parallel processing system having an arithmetic operation unit for executing Very Large Instruction Words (VLIWs), comprising:
   an instruction buffer for fetching VLIWs;
   arithmetic operator means, coupled to the instruction buffer, for parallel processing the VLIWs fetched by the instruction buffer;
   register file means, coupled to the arithmetic operator means, for storing information necessary for the arithmetic operator to process the VLIWs, and wherein the register file means comprises a plurality of register files each having a corresponding register number;

comparing means for: (1) comparing, during the processing of a current VLIW that is processed before a next VLIW, a first register number of a corresponding register file which is to store a processing result of the current VLIW with register numbers which are read by the next VLIW; and (2) generating a first output signal when the first register number matches any one of the register numbers which are read by the next VLIW;

identifying means for: (1) identifying that the register file corresponding to the first register number is unusable on the basis of the first output signal; and (2) generating a second output signal indicating whether the register file corresponding to the first register number is unusable; and control means for: (1) delaying the processing of the next VLIW when the second output signal indicates that the register file corresponding to the first register number is unusable; (2) parallel processing the next VLIW fetched by the instruction buffer means when the second output signal indicates that the register file corresponding to the first register number is usable.

* * * * *